No. 614,627. Patented Nov. 22, 1898.
H. B. SCHMIDT.
EVAPORATOR.
(Application filed May 4, 1897.)

(No Model.) 2 Sheets—Sheet 1.

Witnesses:
E. R. Shipley.
M. S. Belden.

Inventor,
Herman B. Schmidt
by James W. See
Attorney.

THE NORRIS PETERS CO., PHOTO-LITHO., WASHINGTON, D. C.

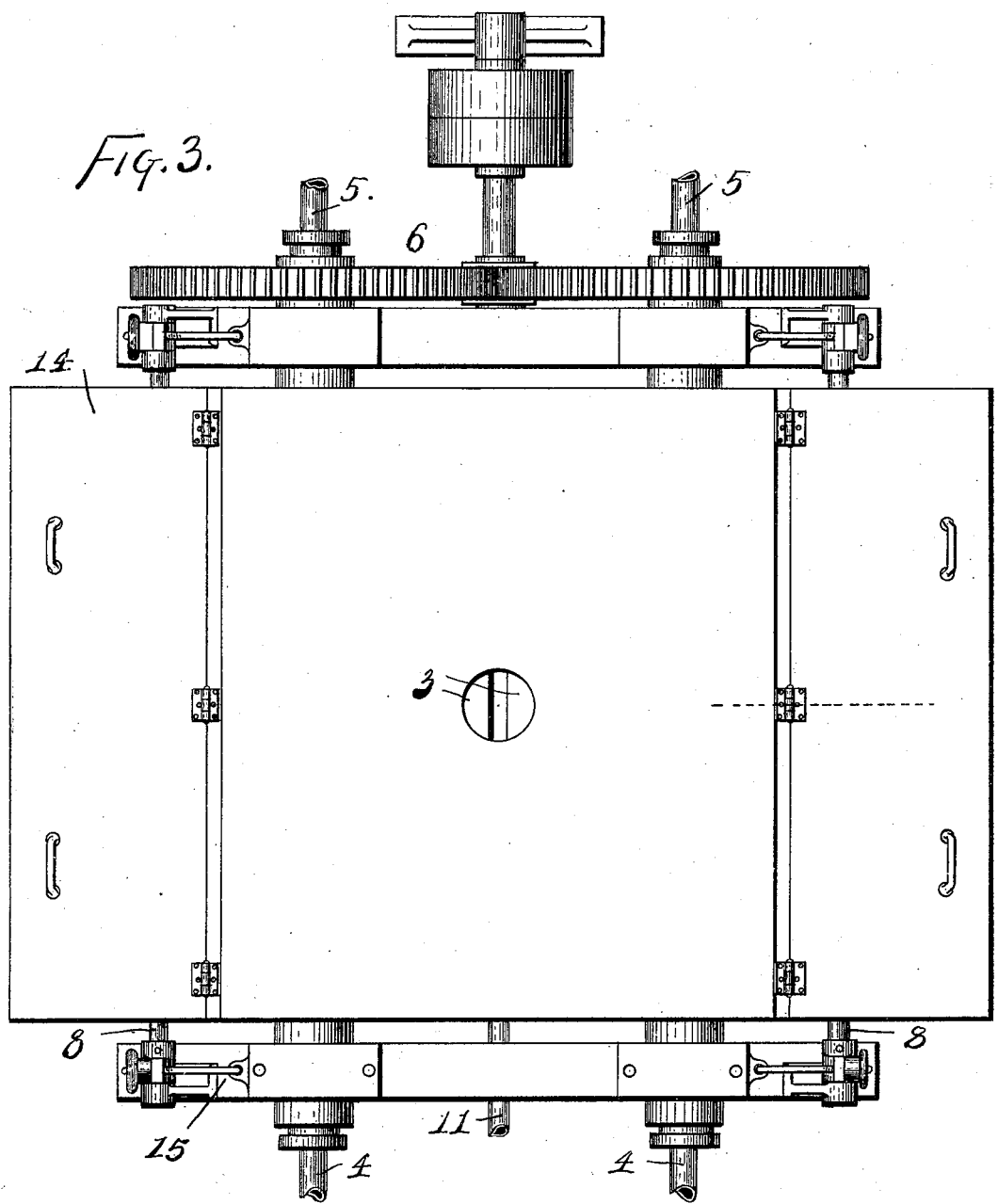

UNITED STATES PATENT OFFICE.

HERMAN B. SCHMIDT, OF CINCINNATI, OHIO, ASSIGNOR OF ONE-HALF TO THE BLACK & CLAWSON COMPANY, OF HAMILTON, OHIO.

EVAPORATOR.

SPECIFICATION forming part of Letters Patent No. 614,627, dated November 22, 1898.

Application filed May 4, 1897. Serial No. 635,097. (No model.)

*To all whom it may concern:*

Be it known that I, HERMAN B. SCHMIDT, of Cincinnati, Hamilton county, Ohio, have invented certain new and useful Improvements in Machines for Thickening Liquids, (Case B,) of which the following is a specification.

This invention pertains to improvements in machines for thickening liquids by process of transferring heat, as by vaporizing portions of the liquid away by adding heat or by cooling a warm liquid by abstracting heat from it.

My present improvements will be readily understood from the following description, taken in connection with the accompanying drawings, in which—

Figure 1:
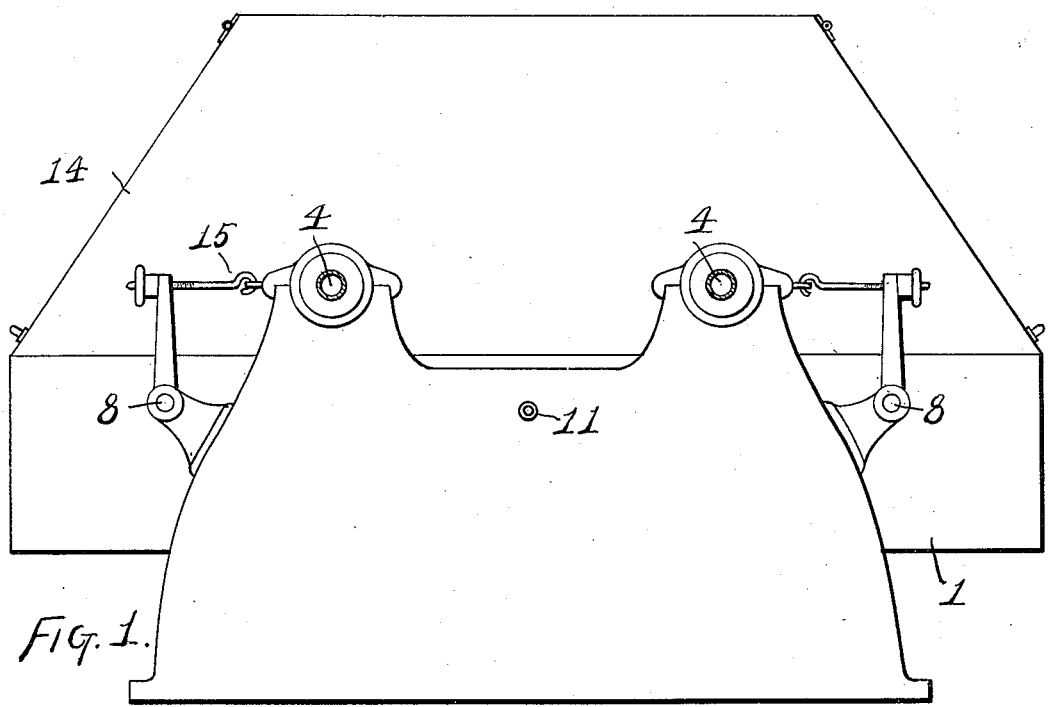
Figure 2:
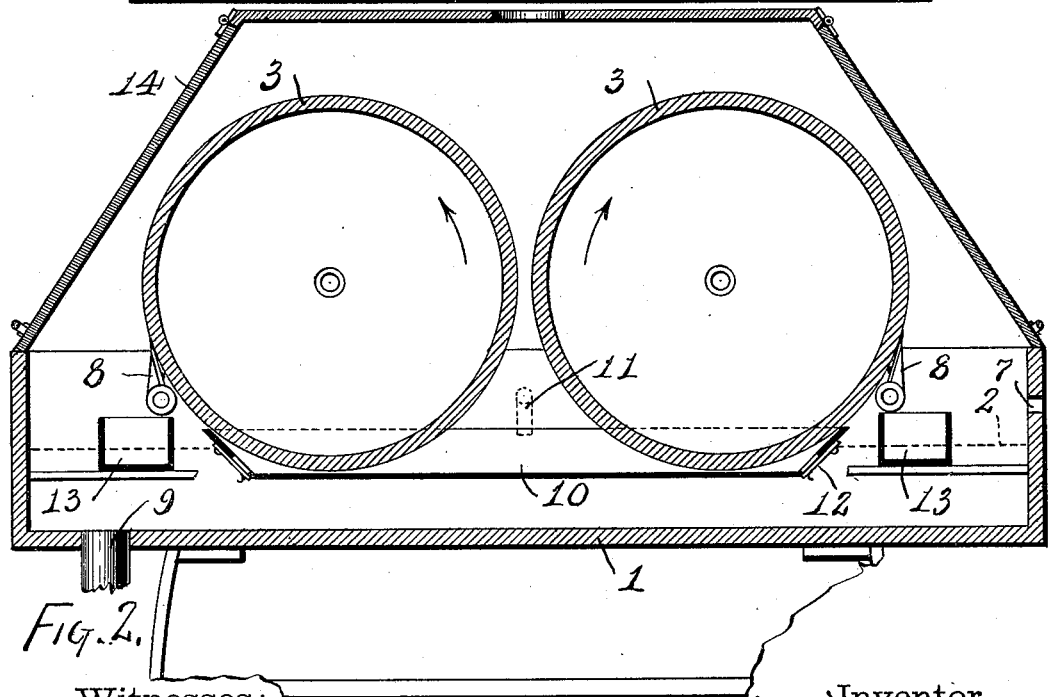

Figure 1 is a side elevation of a machine exemplifying my invention; Fig. 2, a vertical longitudinal section thereof, and Fig. 3 a plan thereof.

In the drawings, 1 indicates a vat adapted to receive the liquid to be dealt with; 2, the upper surface of the liquid therein; 3, a pair of hollow metallic cylinders mounted parallel with each other in suitable bearings and dipping the lower portions of their peripheries into the liquid in the vat, the lower portions of the two cylinders running toward each other; 4, inlet-pipes for the thermic fluid or liquid into the cylinders; 5, outlet-pipes for the thermic fluid or liquid from these cylinders, the inlet and outlet pipes being illustrated as communicating with the interiors of the cylinders through their opposite end journals; 6, driving-gearing connected with the cylinders and exemplifying means by which the cylinders may be rotated by power; 7, an inlet to the vat, the same to be in controlled communication with the source of supply of the liquid to be dealt with; 8, doctors engaging the peripheries of the cylinders at points over the liquid in the vat at those sides of the cylinders approaching the liquid as the cylinders turn; 9, an outlet from the vat to serve in discharging its contents; 10, a pan disposed in the vat below the cylinders and supported in any suitable manner, such pan forming an interior vat; 11, an inlet leading from the exterior of the machine into pan 10; 12, gates in pan 10 serving, when closed, to cut off communication between the interior of pan 10 and the liquid in vat 1, and serving, when open, to permit the liquid in vat 1 to take the same level also in pan 10; 13, catch-boxes disposed removably in the vat under the doctors 8; 14, a hood over the top of the vat and the devices in the vat and having in its upper portion an outlet for the escape of vapors, this hood preferably having doors, as illustrated, to give access to the interior of the machine without the necessity for entirely removing the hood, and 15 adjusting-screws exemplifying ordinary means for adjusting and holding the doctors into scraping relationship to the cylinders.

Assume that the liquid to be dealt with is glue liquor, or that it is the so-called "tank-water" of the packing-house from which it is desired to get solid ammoniate, or that it is a salt solution from which the salt is wanted, or that it is waste soap-lyes, or that it is tanning extract. The liquid portion of the matter is to be gotten out by evaporation, leaving a thicker liquid or a solid. In such case in the use of my machine steam or other hot fluid or liquid is to be passed into and through the cylinders. Assume steam to be employed as the thermal fluid in the cylinders. The hot cylinders are set in motion in the direction of the arrows and the liquid to be dealt with is introduced into the vat, as through inlet 7, and as the quantity of material in the vat lessens by the evaporation of its watery portions the supply in the vat is to be maintained by additions, keeping the contents about at the level of line 2. Gates 12 are to be opened, thus giving the liquid free access to the interior of pan 10. Catch-boxes 13 are to be removed or moved out from under the doctors. The cylinders as they turn in the liquid will become wetted or coated thereby. As the coated surfaces of the cylinders travel upwardly out of the tank the heat of the cylinders causes the lighter liquid portions of the matter to evaporate from the coating, the vapors escaping from the hood and leaving a comparatively dry coating upon the cylinders. The lower portions of the cylinders become bathed, not only by reason of the fact of their dipping into the liquid, but also by reason of the mutual splash or sling of the two cylinders toward each other, each cylinder serving to throw liquid upon the upwardly-moving lower portion of its fellow cylinder, thus enhancing the formation of deposits upon those critical portions of the cylinders where gravity has the greatest effect in drawing the deposits away. The comparatively dry coating formed upon the upper or evaporating portions of the cylinders is carried onward and downward to the doctors, which scrape the coating from the cylinders and return it to the vat, where it joins the liquid therein, the cylinders thus continuing to act on the matter in the vat by evaporating from it its lighter liquid portions, the matter in the vat thus getting continually thicker, the operation being continued as long as found expedient.

In dealing with some kinds of material from which it is desired to obtain a solid or dry residue it will be found impracticable to continue the operation above described, and thereby reach the desired result. This is due to the fact that the continued presentation of the matter to the cylinders is contingent upon the flowing of that material in the vat, and the continual return to the vat by the doctors of comparatively dry material results finally in such condition of the material in the vat that it will not properly flow. Therefore in the use of my machine when I wish to secure a substantially solid product I stop the above-described process before the matter in the vat has lost its capacity for properly mixing and flowing. I then discharge this thick liquid from the vat, leaving the vat empty. I then close gates 12 and place catch-boxes 13 under the doctors. The thick liquid removed from the vat is now charged into pan 10 through inlet 11 and the operation of the machine proceeds as before, except that the doctors scrape from the cylinders the dry solid product and deliver it into the catch-boxes, which may be emptied of their solid contents from time to time. The pan holds a comparatively small quantity of material, but presents it most advantageously to the dipping-surfaces of the cylinders.

In the examples of liquids above referred to the thickening of the liquid was effected by the addition of heat to it, the heat resulting in the evaporation of the lighter liquid portions of the mass. Assume now that the liquid to be dealt with is oil or lard to be thickened by abstracting heat from it. In such case the machine will be used as in the former instance, except that the thermic fluid or liquid supplied within the cylinders will be cold—as, for instance, refrigerated air or refrigerated water or brine. The rotating cylinders take up the liquid in the form of a coating on the cylinders, heat becoming transferred from that coating to the metal of the cylinders and to the thermic agent within the cylinders, resulting in solidification of the coating upon the cylinders. This coating becomes scraped off by the doctors and returned to the vat or delivered to the catch-boxes.

I claim as my invention—

1. In a machine for thickening liquids, the combination, substantially as set forth, of a vat to hold the liquid to be dealt with, a hollow cylinder mounted for rotation in said vat with its lower portion dipping into the liquid therein, a doctor disposed against the cylinder over the liquid and adapted to scrape the coatings from the cylinder and deliver the same into the vat to be engaged again by the cylinder, and a catch-box disposed removably within the vat below the doctor and adapted to intercept the scrapings from the doctor, whereby the coating formed upon the cylinder from the material taken from the vat is removed from the cylinder by the doctor and delivered to the catch-box while the catch-box is under the doctor and delivered to the vat for further action by the cylinder when the catch-box is not under the doctor.

2. In a machine for thickening liquids, the combination, substantially as set forth, of a vat adapted to receive the liquid to be dealt with, a hollow metallic cylinder mounted for rotation in said vat with its lower portion dipping below the liquid therein, a doctor engaging said cylinder, a second vat disposed within the liquid in the first vat under said cylinder, and a gate in said second vat adapted to place the interior of said second vat in free communication with the liquid contained in the first vat exterior to the second vat.

3. In a machine for thickening liquids, the combination, substantially as set forth, of a vat, a pair of hollow metallic cylinders mounted near each other horizontally in said vat with their axes parallel and in a substantially common horizontal plane, gearing connecting said cylinders to cause the peripheries of the cylinders to approach each other below their axes, inlet and outlet pipes connected with the interior of the cylinders, and a doctor engaging the outermost portion of each cylinder.

HERMAN B. SCHMIDT.

Witnesses:
SAM D. FITTON, Jr.,
E. J. SCHRODER.